UNITED STATES PATENT OFFICE.

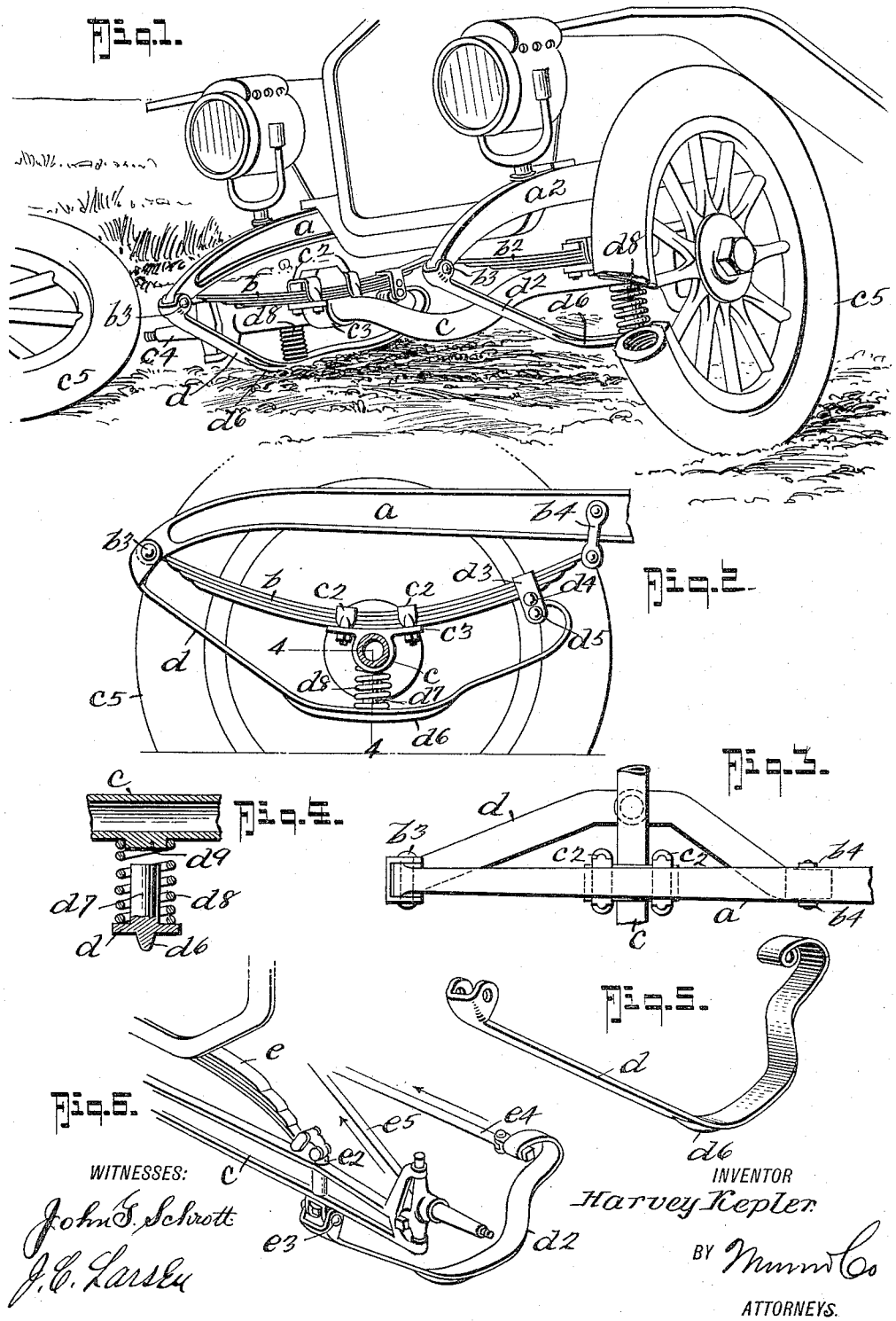

HARVEY KEPLER, OF DEVILS LAKE, NORTH DAKOTA.

AUTO ATTACHMENT.

1,151,474.  Specification of Letters Patent.  Patented Aug. 24, 1915.

Application filed May 29, 1914. Serial No. 841,829.

*To all whom it may concern:*

Be it known that I, HARVEY KEPLER, a citizen of the United States, and resident of Devils Lake, in the county of Ramsey and State of North Dakota, have invented certain new and useful Improvements in Auto Attachments, of which the following is a specification.

My invention relates to vehicles, more especially to automobiles, and the main object thereof is to provide means for preventing the axle end, or any part of the automobile, from touching the ground in the event of a wheel coming off; a further object is to provide such means which are out of the way under normal running conditions; a further object is to so construct the said means as to serve as a runner, in the event of a wheel coming off, whereby the automobile may be hauled to a suitable place for repair; a further object is to so construct and locate the said means as to serve as shock-absorbers and whereby the spring restraining straps now used be dispensed with; a further object is to provide such devices which are, or may be, adapted to any type of automobile, without material change in the structure of the latter; a further object is to provide such devices which, while enabling automobile running with a wheel off, will positively prevent slide skidding of the automobile, though permitting steering the same; and further objects are to provide such devices which are entirely practical, easily installed, very efficient in saving an automobile from turning turtle in the event of a front wheel coming off when running at high speed, and also in preventing injury to the axle from which the wheel has fallen, and which are comparatively inexpensive.

My invention is fully set forth in the following specification, of which the accompanying drawings form a part, in which the same reference characters are used to designate the same parts in each of the views, and in which:—

Figure 1 is a fragmentary, perspective, view of an automobile provided with my invention, and from which a front wheel has been taken; Fig. 2 is a section taken through the front axle, and showing one method of attaching my invention to an automobile; Fig. 3 is a top plan view of the form shown in Fig. 2; Fig. 4 is a section taken on the line 4—4 of Fig. 2; Fig. 5 is a perspective view of one of the devices removed from the automobile; and Fig. 6 is a perspective, fragmentary, view of a modification of the form shown in Figs. 1 to 5, inclusive, adapted for a particular type of automobile.

In the drawings forming a part of this application I have shown a portion of an automobile frame having side-bars $a$ and $a^2$ to which are connected, in the form shown in Figs. 1 to 4, inclusive, the longitudinally arranged front springs $b$ and $b^2$, by means of bolts $b^3$ at the front end of the side-bars and by means of links $b^4$ at the rear ends of said springs, and said springs are held on the axle $c$ by means of clamps $c^2$ and strap $c^3$, and in Fig. 1 I have shown the journal $c^4$ at the end thereof from which the wheel $c^5$ has been taken.

My invention consists of skids $d$ and $d^2$, one for each side of the automobile, in the first form being held, at the front ends thereof, by the bolts $b^3$ and at the rear ends by clips $d^3$ held on the said springs by means of bolts $d^4$ and the skids are pivotally secured thereto by means of bolts $d^5$, and said skids, as shown in Fig. 3, are preferably outwardly projected, the bearing base of the two skids is approximately the same as the wheel base or width of tread, although the pivotal connections of said skids are in line with each other, and I provide a rib $d^6$ on each of the skids to prevent side skidding of an automobile when being carried on one or both of said skids, forwardly or backwardly.

Arranged on each of the skids, directly beneath the axle, is a boss $d^7$ around which is arranged a coil spring $d^8$ impinging on the lower side of the axle, a boss $d^9$ being provided on the axle if desired, and said coil springs may be made of sufficient strength to act as shock absorbers for the upward movement of the automobile after jolts and thus relieve the springs $b$ and $b^2$ of the rebound strain which is frequently disastrous.

In Fig. 6 I have shown my skid attached to a type of automobile which employs transversely arranged springs $e$ in pivotal and swivel connection with the axle, as at $e^2$, and in such form I pivot the forward ends of my skids to the swivel $e^2$, as shown at $e^3$ and I may, and prefer, to connect the rear ends of the skids to the cross-rod $e^4$ which is connected with the bar $e^5$ in operative connection with the steering knuckles of the axle and with the steering gear, whereby said skids will be moved with and in the degree of the wheels, so that an automobile may be steered although one or both of the front wheels may be off, but I do not desire to limit myself to any specific connecting means, nor to any specific type of automobile, nor, indeed, to the specific formation of the skids shown and described, my invention consisting of emergency axle supporting means of such form and in such location as to maintain the axle free from the ground in the event of a wheel being removed, accidentally or purposely.

It will thus be seen that, when a wheel comes off the axle, the axle end is maintained at a height above the ground, and preventing injury thereto, and also, prevent the automobile from turning turtle when a front wheel comes off and, thus, preventing injury to the automobile occupants; my skids are also of value in the event of a bad puncture of the tire with no spare shoes along, as the wheel may be taken off and thus avoid rim-cutting of the tire shoe, the skids sufficing as runners while the automobile is being drawn to a repair shop. My invention may also be applied to all rear axles on any and all automobiles.

Having fully described my invention, what I claim as new, and desire to secure by Letters Patent, is:

1. The combination with an automobile having an axle and wheels thereon; of a device adjacent each wheel for maintaining said axle at an elevation, upon removal of either or both wheels, said devices being provided, each, with a rib arranged parallel to said wheels to prevent side skidding while the automobile is being hauled, with a wheel removed.

2. The combination with an automobile having an axle and wheels thereon; of a skid adjacent to and parallel to each wheel for maintaining said axle at an elevation, upon removal of either or both wheels, and resilient means arranged between each skid and the axle to take the rebound of the automobile springs and thus serve as a shock absorber.

3. As an article of manufacture, for use on an automobile, a skid, comprising a ribbon of suitable material of substantially V-shape, and having pivot lugs at the ends thereof in a substantially higher plane than the bearing portion of said skid.

4. The combination with an automobile having an axle and wheels thereon; of a skid adjacent to each steering wheel of said automobile, a universal joint connecting the forward end of said skid with one part of said automobile, and a substantially universal joint connecting the rear end of said skid with another part of said automobile, to permit deflection of said skid from the vertical, longitudinal, plane of said automobile.

Intestimony that I claim the foregoing as my invention, I have signed my name in presence of the subscribing witnesses.

HARVEY KEPLER.

Witnesses:
M. A. HOGHANG,
ARTHUR NESS.

Copies of this patent may be obtained for five cents each, by addressing the "Commissioner of Patents, Washington, D. C."